H. PEARCE, T. R. G. PARKER & F. W. WRIGHT.
TRIP MECHANISM OF TWO-REVOLUTION PRINTING PRESSES.
APPLICATION FILED JAN. 20, 1913.

1,106,403.

Patented Aug. 11, 1914.

6 SHEETS—SHEET 1.

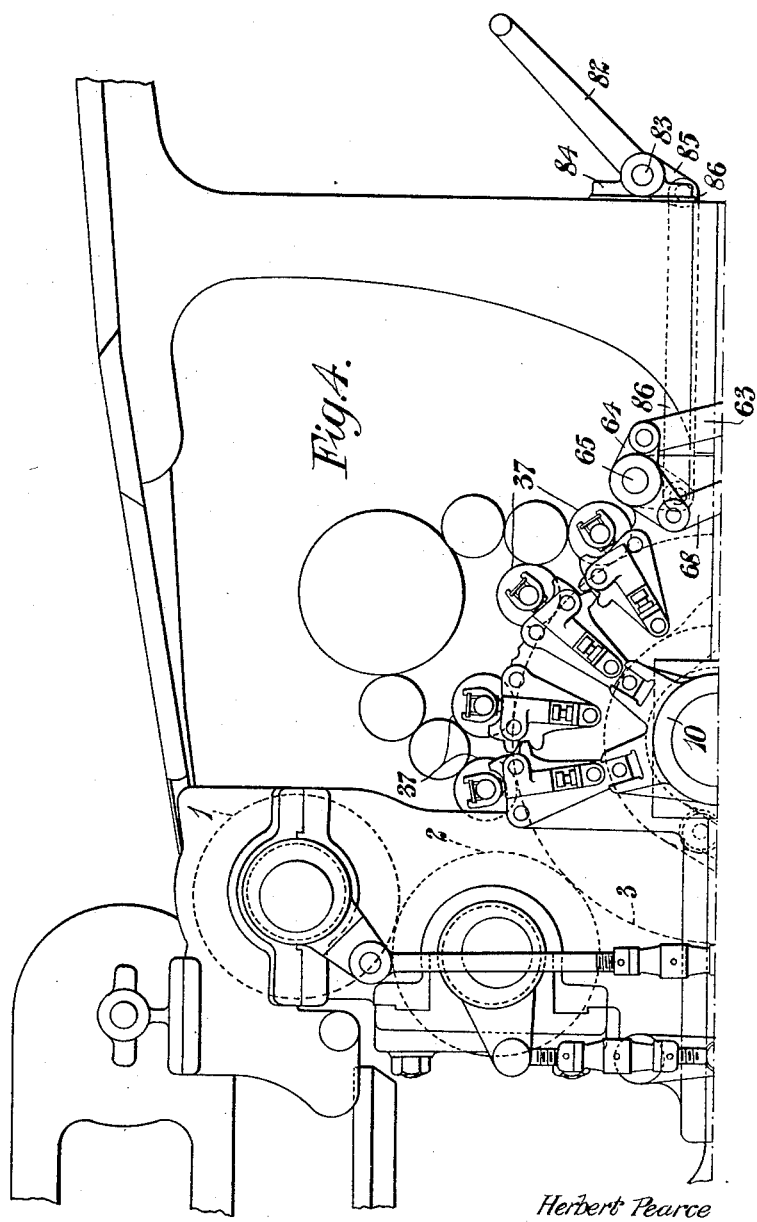

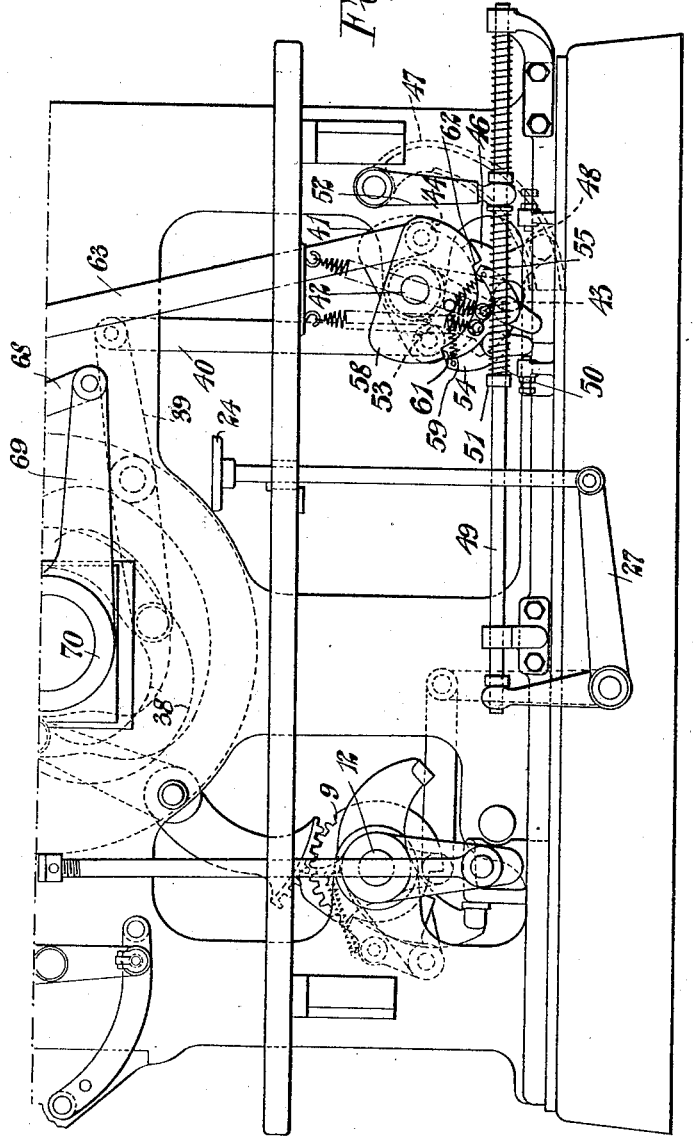

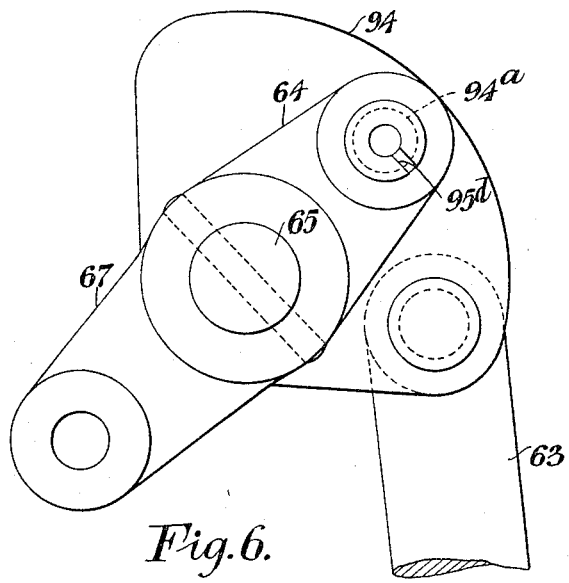
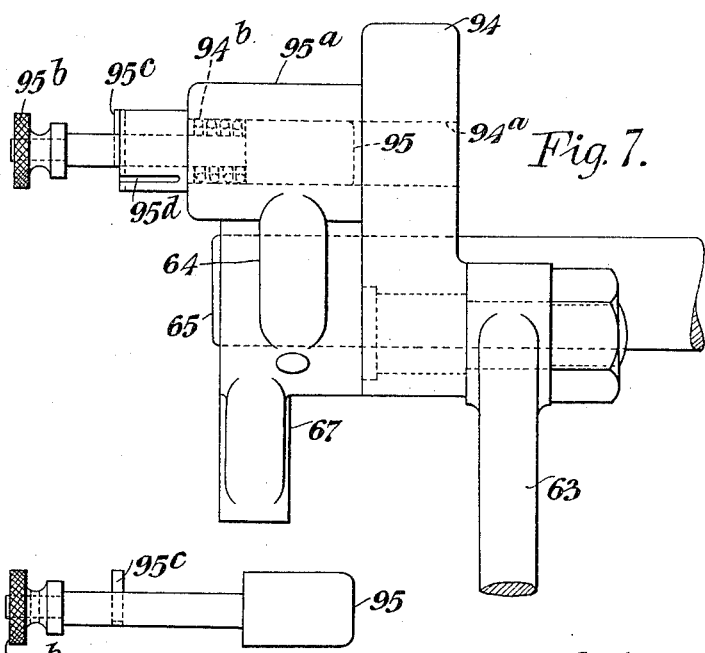

UNITED STATES PATENT OFFICE.

HERBERT PEARCE, THOMAS ROBERT GILLETT PARKER, AND FRED WESLEY WRIGHT, OF BROADHEATH, ENGLAND, ASSIGNORS TO LINOTYPE AND MACHINERY LIMITED, OF LONDON, ENGLAND.

TRIP MECHANISM OF TWO-REVOLUTION PRINTING-PRESSES.

1,106,403. Specification of Letters Patent. Patented Aug. 11, 1914.

Application filed January 20, 1913. Serial No. 743,079.

*To all whom it may concern:*

Be it known that we, HERBERT PEARCE, THOMAS ROBERT GILLETT PARKER, and FRED WESLEY WRIGHT, subjects of the King of the United Kingdom of Great Britain and Ireland, residing at Linotype and Machinery Works, Broadheath, in the county of Chester, England, have invented new and useful Improvements in the Trip Mechanism of Two-Revolution Printing-Presses, of which the following is a specification.

The present invention consists in improvements in the trip mechanism of two revolution printing presses described in our pending application for Letters Patent, Serial Number 710882, filed July 22nd 1912.

Figure 1:
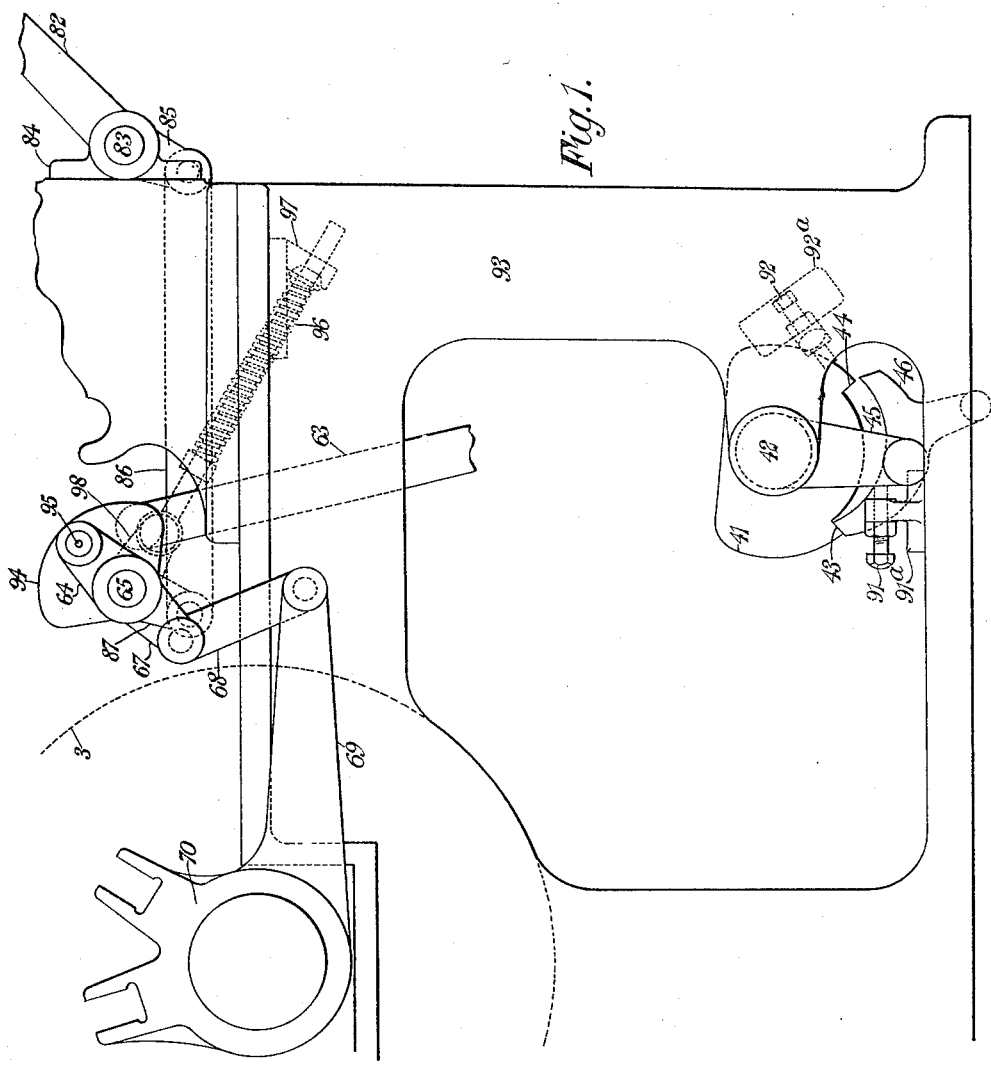

The said application describes, and illustrates in the respective Figures 1 and 1ª, automatic means for occasionally tripping the inking rollers of the form or plate cylinder. These two figures are reproduced herein for the purpose of this present application as Figs. 4 and 5. Referring to them, 3 is the form or plate cylinder, and 37, 37 are the rollers for inking it. 38 is a cam groove on one end of the cylinder 3, rocks a double armed lever 39 fulcrumed on the adjacent side frame. The opposite end of this lever 39 is connected by a link 40 to a semi-circular pawl plate 41 loose at the feeder-side of the press on a transverse shaft 42. This plate 41 has an arcual recess in its semi-circular periphery, thereby establishing two shoulders 43, 44. There is an arm 45 fast on the said shaft 42 having pivoted on its outer end, a double pawl 46 the noses of which are adapted to engage with the said shoulders alternately, according to the direction in which the pawl is rocked. This pawl 46 is so rocked by an eccentric grooved arm 47 engaging a roller on an arm 48 projecting in a suitable direction for the purpose, from the double pawl 46, the rocking motion being communicated to the grooved arm 47 from the feeder's control pedal 24 through a bell crank lever 27 fulcrumed on the side frame, a horizontal push rod 49 and a coil spring 50 surrounding this rod 49 and compressible between a collar 51 fast on it and an arm 52 axially fast to the grooved arm 47 above mentioned. To trip the inking rollers 37, the feeder depresses the pedal 24 and this, acting through the connections described, rocks the left-hand nose of the double pawl 46 into the recess in the pawl plate 41 and therefore, into the path of its lefthand shoulder 43, and as the cam groove 38 lifts its end of the double arm lever 39, the said shoulder 43 is turned downward through a corresponding arc, taking the pawl plate 41 and pawl 46 with it, and, as its arm 45 which carries the pawl 46, is fast to the transverse shaft 42, the latter is turned likewise. On an arm 53 fast to the outer end of the said shaft 42, are pivoted two pawls 54, 55, one on each side of the median line of the said arm; and, at its outer end, the said shaft 42 has a second pawl plate 58 of the same shape as the one 41 already described and mounted on the shaft in the same way. Both these pawls 54, 55, are urged by respective springs 59, 60, which pull from the same point on the median line, into contact with the said second pawl plate 58 between the shoulders 61, 62, on it. The turning of the shaft 42 makes the right-hand one 55 of these two pawls, engage the respective shoulder 62 on the second pawl plate 58 and turn it, thereby, through suitable link and lever connections 63, 65, and 68, actuating the particular device, cam or otherwise, 69, 70, that moves the inking rollers 37 away from the form or plate cylinder 3. Manual means for untripping and tripping the inking rollers 37 are also described and illustrated in the said figures and are as next described.

Referring to the accompanying Figs. 4 and 5, 82 is a hand lever fast on the feeder side end of a transverse rock shaft 83 turning in a bearing 84 on a side frame of the press and having an arm 85 fast to the inner end of it, the said arm 85 being connected by a link 86 to an arm 87 fast to the shaft 65 already described and through it and the connected parts, to the rollers 37.

The invention comprises means for enabling the press attendant to increase at any time during the job, the quantity of ink being deposited per unit of area upon either the transfer cylinder 2 or the plate or form cylinder 3. The automatic tripping of the pending application Serial Number 710882 above mentioned, is common to the impression cylinder 1 and the inking rollers 37, or is limited to the latter. In either case, the energy necessary to trip the said rollers, passes from the last mentioned pawl plate 41 through the link 63, the rock shaft 65, the arm 64 heretofore connecting the two, and the arm 69 forming part of the inking mechanism trip proper—say 70. Now, a machine attendant often wants to deposit an extra quantity on the transfer cylinder 2 or on the plate or form cylinder 3, according as to whether the press is an offset one or not, before he begins to print (thereby effecting an extra depositing of ink known as a "rolling up"), in order that the ink-absorbing property of the transfer cylinder surface may be satisfied, and it, or the plate or form cylinder 3, made to effectively carry a sufficient quantity of ink to yield an impression on the sheet of the desired depth of color. Or, the need to increase the deposit may arise during the course of the job. To enable him to do either of these things, he must be able to leave the inking rollers 37 untripped without interfering with the automatic tripping of the cylinders 1, 3, or other organs of the press. The improved means are of a manual type for severing and re-making at the respectively desired moments, the connection between the inking rollers and the above described means for automatically tripping and untripping them and includes non-interference with the hand mechanism 82 to 87 for tripping the inking rollers 37, if such non-interference is desirable.

The invention further comprises automatic means for preventing the inking rollers rebounding toward the form or plate cylinder at the moment when the roller lifting device is moved smartly up against a fixed stop by the automatic roller tripping mechanism. The said means consists of a spring rod pushing from a fixed abutment upon an arm fast upon a rock shaft of the said mechanism, the said rod and arm being so positioned relatively to each other that they are on a dead center when the inking rollers are on the cylinder and that the rod is exerting its maximum leverage on the arm at the moment the roller lifting device contacts with the said stop.

The invention further comprises means by which the cylinder tripping means of the said pending application are extended to the transfer cylinder.

The invention further comprises means by which the said transfer cylinder can be left in contact with the form or plate cylinder while the latter is being "rolled up", the impression cylinder standing tripped for the time being.

All the above mentioned improvements are hereinafter described in detail, reference being made to the drawings accompanying this specification and afterward claimed.

Figure 2:
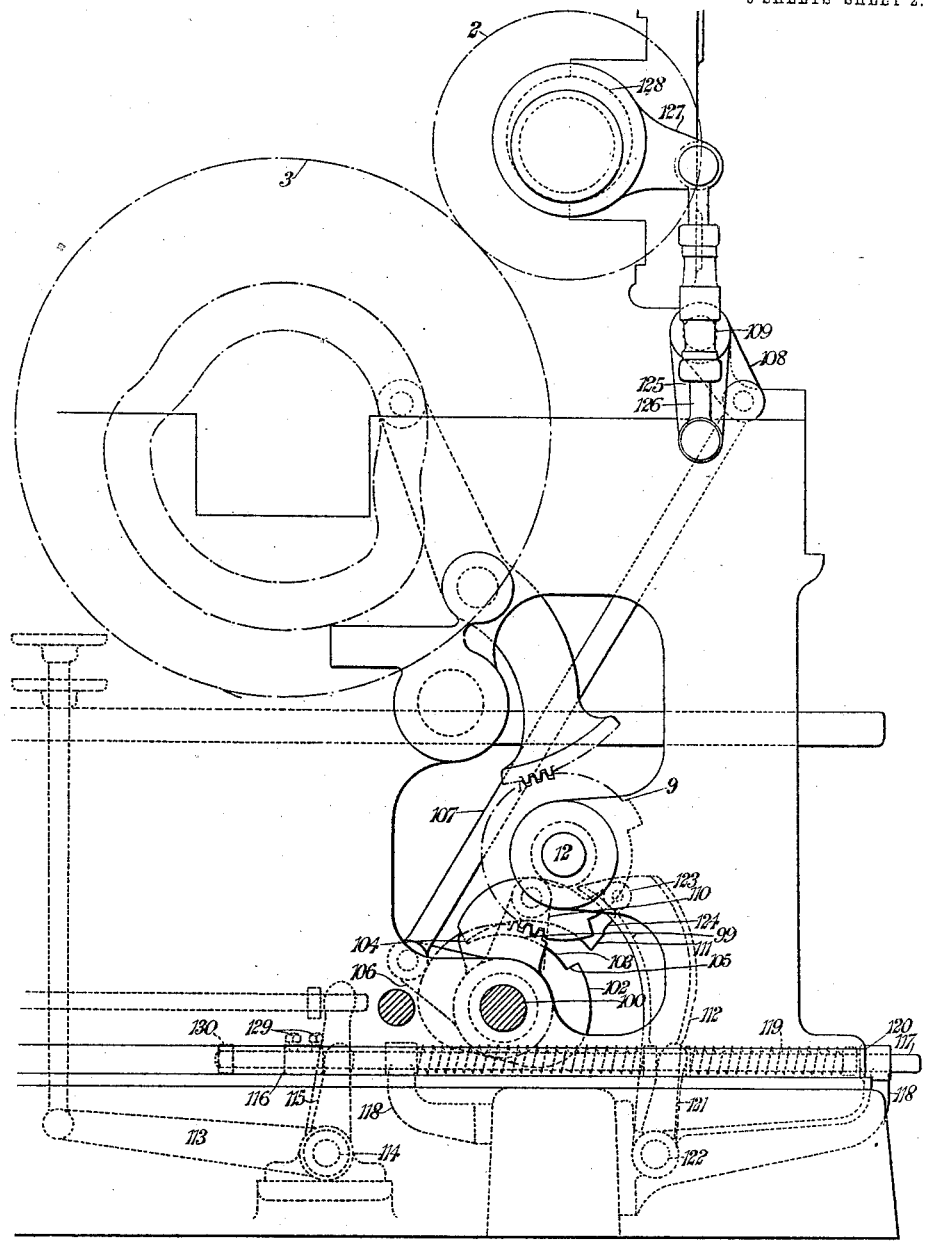
Figure 3:
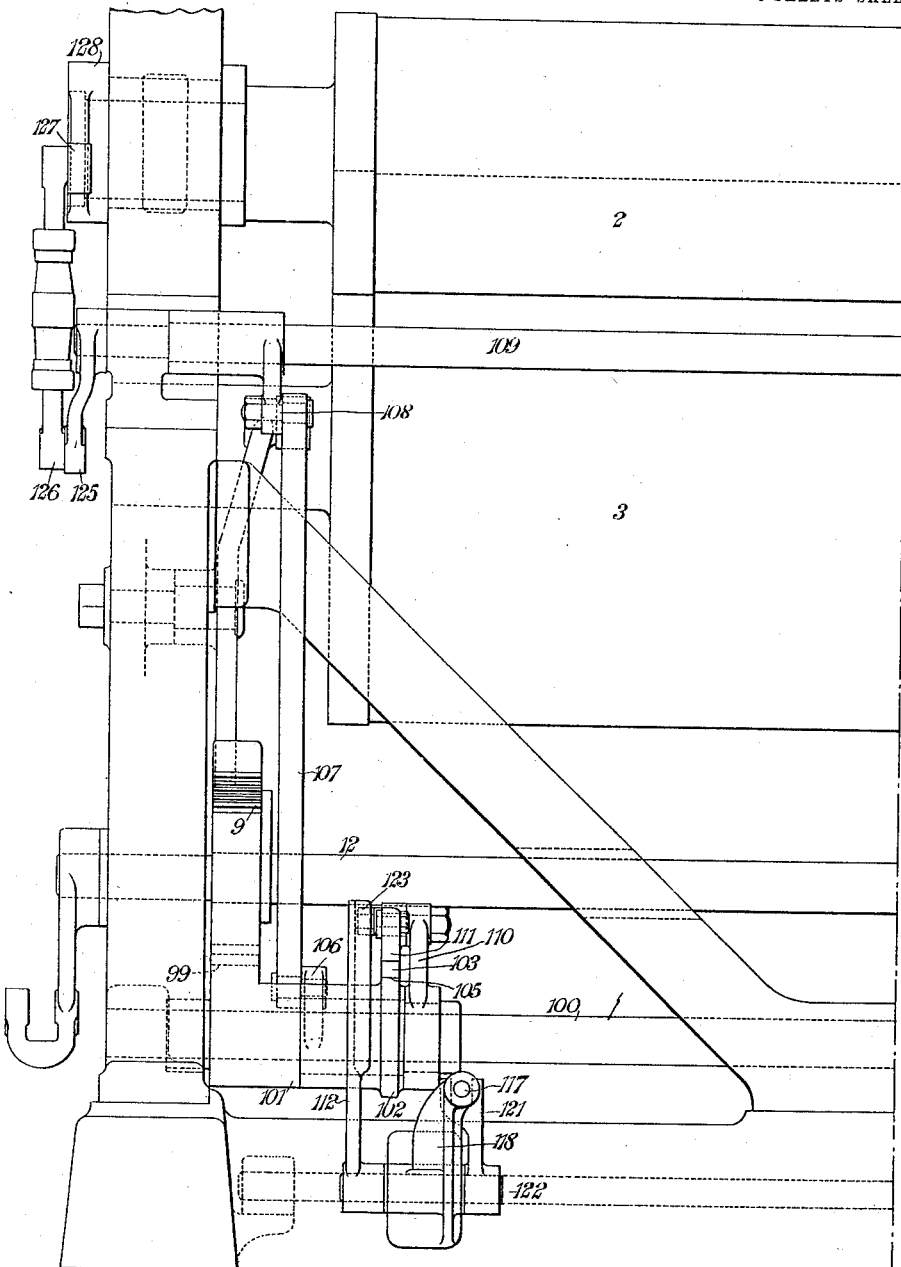

In the said drawings, Figure 1 is a side elevation of a part of a press from the feeder side; Fig. 2, a side elevation of a part of the same press from the gear side; and Fig. 3, an elevation of half the end of a press. Figs. 4 and 5 together constitute a side elevation from the feeder side of the press. Figs. 6 to 8 are details of the means for enabling the press attendant to increase the deposit of ink on either the transfer cylinder or the form cylinder.

A preferred constructional form of the above mentioned means for enabling the press attendant to increase at any time during the job, the quantity of ink being deposited per unit of area upon either the transfer cylinder 2 or the plate or form cylinder 3 is illustrated in the accompanying Figs. 1, 6, 7 and 8. It has already been explained that these improved means are of a manual type for severing and remaking at the respectively desired moments, the connection between the inking rollers and the above described means for automatically tripping and untripping them and includes non-interference with the hand mechanism 82 to 87 for tripping the inking rollers 37, if such non-interference is desirable. Accordingly, the link 63 above mentioned, ceases to be connected by a constant pivot with the rock shaft 65, but is, instead, connected by a pivot of the same kind to a sector plate 94 loose on the said shaft 65 and adapted to be operatively held to, or disconnected from, that shaft, by a spring plunger 95 working in a horizontal socket $95^a$ carried by the connecting arm 64 and coöperating with a socket $94^a$ in the section plate 94. When the plunger 95 is in register with the socket $94^a$, it is engaged therein by its spring $94^b$ resilient between a shoulder within the socket $95^a$ and one on the plunger 95. The latter is disengaged from the said socket $95^a$ by the attendant pulling the milled head $95^b$ presented by the plunger 95 outside the socket $95^a$, away from the latter until the stud $95^c$ fast on the stem of the plunger 95, clears the slot $95^d$ and then turning the head $95^b$ until the said stud acts as a detent to hold the plunger 95 disengaged from the sector plate by bearing against the outer end of the socket $95^a$ as shown in Fig. 7. When the attendant wants the plunger 95 to reëngage with the sector plate 94, he turns the milled head $95^b$ until the stud $95^c$ registers with the slot $95^d$, whereupon the spring $94^b$ pushes the plunger 95 up to the said plate, and into the socket $94^a$ as soon as registration between plunger and socket occurs.

A preferred constructional form of the above mentioned automatic means for preventing the inking rollers 37 rebounding toward the form or plate cylinder 3, is illustrated in the accompanying Fig. 1.

96 is a spring rod pushing from an abutment 97 on the press frame 93, against an arm 98 fast to the rock shaft 65 already described. It is to be noted that both rod 96 and arm 98 are so positioned relatively to each other, that they are on a dead center when the inking rollers 37 are down on the cylinder 3, and that as soon as the said rollers 37 are tripped, *i. e.*, at the moment the device 70 comes up to its stop and would start the rollers 37 rebounding if it were not prevented, the rod 96 exerts its maximum leverage on the arm 98 and so holds the inking rollers 37 stationary.

A preferred constructional form of the above mentioned means by which the cylinder tripping means of the said pending application are extended to the transfer cylinder, is illustrated in the accompanying Fig. 2. The loose gear 9 on the transverse shaft 12 (both in the pending application) rocks a second and similar gear loose on a second and parallel shaft 100. This second gear 99 has a long boss 101 which provides a bearing for a loose pawl plate 102 having an arcual recess 103 establishing two shoulders 104, 105, as well as for a radial arm 106, the outer end of which latter is connected by a link 107 to a similar arm 108 on a transverse shaft 109 near the transfer cylinder 2. The outer end of the boss 101 has, fast on it, a radial arm 110 upon the outer end of which is pivoted a double pawl 111, the noses of which are positioned to engage the respective shoulders 104, 105, just mentioned, alternately, according to the direction in which the pawl 111 is rocked. This rocking is effected from the feeder's foot pedal 24, a similar eccentric grooved arm 112 and intermediate connections consisting of a bell crank lever 113 fast on a transverse shaft 114, an arm 115 fast to the said shaft and engaging a collar 116 fast (for the purpose of this fourth part of the invention) on a horizontal rod 117 sliding in guides 118, 118, a spring 119 compressible and resilient between a collar 120 fast on the rod 116 and an arm 121 fast to the pivot shaft 122 of the said arm 112; the said arm 112 engaging a roller 123 on an arm 124 projecting in a suitable direction from the pawl. Each end of the transverse shaft 109 last mentioned, has a radial arm 125 fast to it, the outer end of each of these arms being pivotally connected by a link 126 to a similar arm 127 fast to an eccentric journal 128 at the respective end of the transfer cylinder 2, so that the latter is automatically tripped in conjunction with the impression cylinder and the inking rollers. So long as the press is running, the transfer cylinder 2 turns in contact with the form or plate cylinder 3 and is tripped only when it becomes necessary to trip the impression cylinder by means of the foot pedal 24; this latter thus becoming a switch to switch the tripping automaticity on to the axis of the transfer cylinder 2.

A preferred constructional form of the above mentioned means by which the transfer cylinder can be left in contact with the form or plate cylinder while the latter is being "rolled up", is illustrated in the accompanying Fig. 2. It must be understood that the impression cylinder will remain tripped for the time being. These means are to be understood as including any device which is capable of preventing the depression of the foot pedal 24 already described, by the press feeder, tripping the transfer cylinder. According to the said form, the collar 116 above described is operatively releasable from the rod 117 to at least the extent of the rock of the bell crank lever 113 not affecting the said rod. Thus when the two screws 129 are loosened and the collar 116 moved up to the stop 130 on the end of the rod 117, the lever 113 will rock without moving the latter.

Having described our invention, we declare that what we claim and desire to secure by Letters Patent is:—

1. The combination with a rock shaft forming part of the automatic means for tripping the cylinder inking rollers of a two revolution printing press, of means for manually disconnecting two adjacent and connected members of the said automatic means, for holding them disconnected for the desired time, and for reconnecting them, consisting of an arm fast and a sector plate loose on the said shaft and in parallel planes, a spring plunger working in the said arm to and from the said sector plate in a direction parallel with the said shaft, a socket in the sector plate in which the plunger can engage and a detent to hold the plunger disengaged from the socket.

2. Automatic means for preventing the inking rollers rebounding toward the form or plate cylinder at the moment they reach their tripped position, consisting of an arm fast on a rock shaft of the automatic mechanism for tripping the inking rollers, with a spring rod adapted to push radially along the said arm from a fixed abutment, the arrangement of arm and rod being such that they will be at dead centers at the moment the said rollers reach their tripped position.

In witness whereof we have hereunto set our hands in the presence of two witnesses.

HERBERT PEARCE.
THOMAS ROBERT GILLETT PARKER.
FRED WESLEY WRIGHT.

Witnesses:
JOSEPH LAMB,
FRED SPENCE.

---

Copies of this patent may be obtained for five cents each, by addressing the "Commissioner of Patents, Washington, D. C."